(12) United States Patent
Mihajlovic et al.

(10) Patent No.: US 11,095,955 B2
(45) Date of Patent: Aug. 17, 2021

(54) METHOD AND SYSTEM FOR DELIVERING AN INTERACTIVE VIDEO

(71) Applicant: FLAVOURWORKS LTD, Chichester (GB)

(72) Inventors: Pavle Mihajlovic, London (GB); Jack Attridge, Chichester (GB)

(73) Assignee: FLAVOURWORKS LTD, West Sussex (GB)

( * ) Notice: Subject to any disclaimer, the term of this patent is extended or adjusted under 35 U.S.C. 154(b) by 0 days.

(21) Appl. No.: 16/311,926

(22) PCT Filed: Jun. 20, 2017

(86) PCT No.: PCT/GB2017/051797
§ 371 (c)(1),
(2) Date: Dec. 20, 2018

(87) PCT Pub. No.: WO2017/220991
PCT Pub. Date: Dec. 28, 2017

(65) Prior Publication Data
US 2019/0208288 A1    Jul. 4, 2019

(30) Foreign Application Priority Data

Jun. 20, 2016 (GB) ..................... 1610749

(51) Int. Cl.
| | | |
|---|---|---|
| *H04N 7/10* | (2006.01) |
| *H04N 7/025* | (2006.01) |
| *H04N 21/8545* | (2011.01) |
| *H04N 21/472* | (2011.01) |
| *H04N 21/23* | (2011.01) |
| *G11B 27/00* | (2006.01) |
| *H04N 21/431* | (2011.01) |
| *H04N 21/845* | (2011.01) |

(52) U.S. Cl.
CPC ....... *H04N 21/8545* (2013.01); *G11B 27/007* (2013.01); *H04N 21/23* (2013.01); *H04N 21/4312* (2013.01); *H04N 21/47202* (2013.01); *H04N 21/47217* (2013.01); *H04N 21/8456* (2013.01)

(58) Field of Classification Search
CPC ................................................ H04N 21/8545
See application file for complete search history.

(56) References Cited

U.S. PATENT DOCUMENTS

| | | | |
|---|---|---|---|
| 8,457,387 B2 * | 6/2013 | Presetenback ...... | G06F 3/04815 382/154 |
| 9,271,029 B2 * | 2/2016 | Kochale .......... | H04N 21/23412 |
| 9,699,236 B2 * | 7/2017 | Gopalakrishnan .......................... H04L 67/1085 |
| 2002/0122430 A1 * | 9/2002 | Haberman .......... | H04N 21/235 370/429 |

(Continued)

OTHER PUBLICATIONS

International Search Report for PCT/GB2017/051797 dated Sep. 29, 2017, 3 pages.

*Primary Examiner* — Gigi L Dubasky
(74) *Attorney, Agent, or Firm* — Nixon & Vanderhye, P.C.

(57) ABSTRACT

A method for delivering an interactive video is provided, including delivering a first video clip of the interactive video in a first loop, and upon receiving a first input during delivery of the first video clip, delivering a first exit sequence of the interactive video, the first exit sequence including a first exit video clip.

23 Claims, 13 Drawing Sheets

(56) References Cited

U.S. PATENT DOCUMENTS

| | | | |
|---|---|---|---|
| 2004/0018478 A1* | 1/2004 | Styles | G09B 5/00 |
| | | | 434/350 |
| 2004/0230410 A1* | 11/2004 | Harless | G10L 15/26 |
| | | | 703/6 |
| 2005/0069225 A1 | 3/2005 | Schneider et al. | |
| 2009/0074377 A1 | 3/2009 | Herz | |
| 2009/0204909 A1* | 8/2009 | Hornbaker | H04N 7/17318 |
| | | | 715/757 |
| 2009/0324192 A1* | 12/2009 | Ogura | G11B 27/007 |
| | | | 386/248 |
| 2010/0037138 A1 | 2/2010 | Scherbakov et al. | |
| 2012/0198338 A1* | 8/2012 | Flint | G11B 27/034 |
| | | | 715/726 |
| 2014/0082669 A1* | 3/2014 | Dawson | H04N 21/4858 |
| | | | 725/41 |
| 2015/0185965 A1* | 7/2015 | Belliveau | G11B 27/031 |
| | | | 715/723 |
| 2017/0201353 A1* | 7/2017 | Kirkby | H04L 47/193 |
| 2017/0318067 A1* | 11/2017 | Selekman | H04L 65/601 |

\* cited by examiner

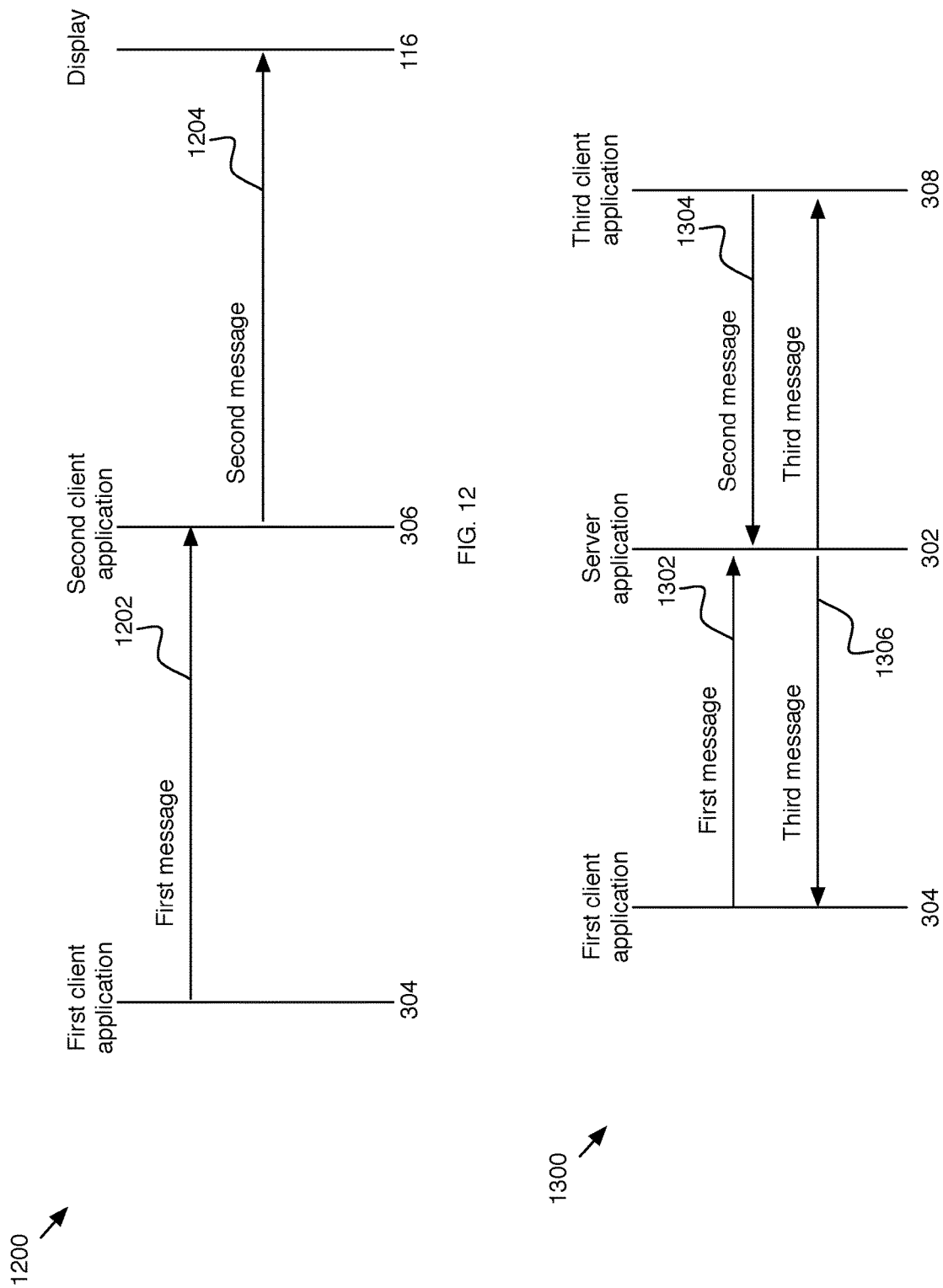

METHOD AND SYSTEM FOR DELIVERING AN INTERACTIVE VIDEO

This application is the U.S. national phase of International Application No. PCT/GB2017/051797 filed Jun. 20, 2017 which designated the U.S. and claims priority to GB Patent Application No. 1610749.2 filed Jun. 20, 2016, the entire contents of each of which are hereby incorporated by reference.

FIELD

The present application is in the field of delivering video. More particularly, but not exclusively, the present application relates to interactive video.

BACKGROUND

Interactive video utilizes dynamic input to determine what video frames and/or video content is delivered. Interactive video can be used in entertainment, education, and gaming.

Previous methods of creating interactive content have used entirely computer-generated methods, including generating sprites, vectors, or 3d models, to produce video in response to real-time inputs. Computer-generated graphics can create precise event sequences in response to, for example, a user's input in a video game. Creating high-quality graphics that are realistic and engaging with computer-generated methods is processor-intensive, inefficient, and slow, however. For these reasons, higher quality interactive computer-generated graphics typically can only be accessed with computers that include advanced graphics processing units, such as desktop computers.

Previously, users have not been able to access higher quality interactive content using the lower performing hardware available on a smartphone or tablet computer, however, which offer more limited graphics processing units, and limited battery life.

In addition, creating high-quality interactive content including computer-generated graphics has entailed a tremendous cost and complexity for content creators. The expense and technical complexity required may bar those who would like to create high quality interactive video content from using computer-generated methods.

Rather than relying on computer-generated graphics rendered in real time to create interactive content, it is possible to use at least some previously generated video files. By providing previously generated video clips, such as live action video, this may avoid the need to dynamically render processor-intensive graphics in response to user inputs. The pre-generated videos can also use real actors and props, which can make interactive content appear more realistic than those using computer-generated graphics.

Creating interactive content based on previously generated video clips requires the dynamic integration of multiple pre-recorded clips in response to real-time user inputs. For example, a video game may, in response to user inputs, display a character sequentially walking in a first direction, sitting, then walking in a second direction. Each of the walking and sitting segments may be generated from a different pre-recorded video clip, for example a live action-based video clip.

Previously generated video-based products have been hindered by awkward pauses between video clips, and jarring transitions. For example, if two video clips delivered sequentially do not provide a careful transition in the position or orientation of a character, that character will appear to jerk or move unnaturally. Previous products have therefore not appeared responsive, or natural.

It is an object of the present applications to provide methods of delivering and generating interactive video that overcomes the disadvantages of the prior art, or at least provides a useful alternative.

SUMMARY

According to a first aspect of the invention, there is provided a method for delivering an interactive video, the method including:

delivering a first video clip of the interactive video in a first loop; and upon receiving a first input during delivery of the first video clip, delivering a first exit sequence of the interactive video, the first exit sequence including a first exit video clip.

According to a further aspect, the first video clip may include live action video.

According to a further aspect, delivering the first video clip in the first loop may further comprise delivering the first video clip in a first direction.

According to a further aspect, delivering the first video clip in the first loop may further comprise alternating delivery of the first video clip in the first direction and delivery of the first video clip in a second direction.

According to a further aspect, delivering the first video clip in the first loop may further comprise delivering the first video clip at a first playback rate and delivering the first video clip at a second playback rate.

According to a further aspect, delivering the first video clip in the first loop may further comprise delivering the first video clip at least at one additional playback rate.

According to a further aspect, delivering at least one of the first video clip or the first exit sequence may further comprise cross fading between a first frame and a second frame.

According to a further aspect, delivering the first video clip in the first loop may further comprise delivering an end point frame of the first video clip only once during a transition between the first direction and the second direction.

The method may further include the step of:
delivering an intro video clip before the first video clip.

According to a further aspect, delivering the first exit sequence including the first exit video clip may further comprise delivering at least a portion of a remainder of the first video clip in the first direction or the second direction.

According to a further aspect, delivering the first exit sequence including the first exit video clip may further comprise delivering a remainder of the first video clip in the first direction or the second direction.

According to a further aspect, delivering the first exit sequence including the first exit video clip may further comprise delivering a remainder of the first video clip in the second direction and delivering the first video clip in the first direction.

According to a further aspect, delivering the first exit sequence including the first exit video clip may further comprise delivering a remainder of the first video clip in the first direction or the second direction at an increased playback rate over a default playback rate.

According to a further aspect, delivering the first exit sequence including the first exit video clip may further comprise selecting the first exit video clip based on a video clip play time.

According to a further aspect, delivering the first exit sequence including the first exit video clip may further comprise selecting the first exit video clip based on an exit clip duration.

According to a further aspect, delivering the first exit sequence including the first exit video clip may further comprise selecting the first exit video clip based on an exit clip content.

The method may further include the steps of:
delivering a second video clip in a second loop;
upon receiving a second input during delivery of the second video clip, delivering a second exit video sequence including a second exit clip.

According to a further aspect, delivering the first video clip and the first exit sequence may comprise displaying the first video clip and the first exit sequence.

According to a further aspect, delivering the first video clip and the first exit sequence may comprise transmitting the first video clip and the first exit sequence to a client application.

According to a further aspect, the input may be received at a first client application from a second client application.

According to a further aspect, the input may be received at a server application from a first client application.

According to a further aspect, there may be a system for delivering an interactive video via any method of the first aspect.

According to a further aspect, there may be a computer program configured to perform a method as claimed in any method of the first aspect.

According to a further aspect, there is an electronically readable medium storing a computer program as claimed in any method of the first aspect.

According to a second aspect of the invention, there is provided a method of creating an interactive video according to the first aspect, the method including:
providing instructions to deliver a first video clip of the interactive video in a first loop;
providing instructions to wait for input during delivery of the first video clip; and
providing instructions to deliver a first exit sequence of the interactive video, the first exit sequence including a first exit video clip.

According to a further aspect, there may be a system for creating an interactive video via a method as claimed in any method of the second aspect.

According to a further aspect, there may be a computer program configured to perform a method as claimed in any method of the second aspect.

According to a further aspect, there may be an electronically readable medium storing a computer program as claimed in claim any method of the second aspect.

Other aspects of the invention are described within the claims.

BRIEF DESCRIPTION OF THE DRAWINGS

Embodiments of the invention will now be described, by way of example only, with reference to the accompanying drawings in which:

FIG. 12: depicts sequence diagram 1200, in accordance with an embodiment of the invention;

FIG. 13: depicts sequence diagram 1300, in accordance with an embodiment of the invention.

DETAILED DESCRIPTION OF PREFERRED EMBODIMENTS

The present invention provides a method, system, and computer program to facilitate the delivery of an interactive video.

Figure 1:
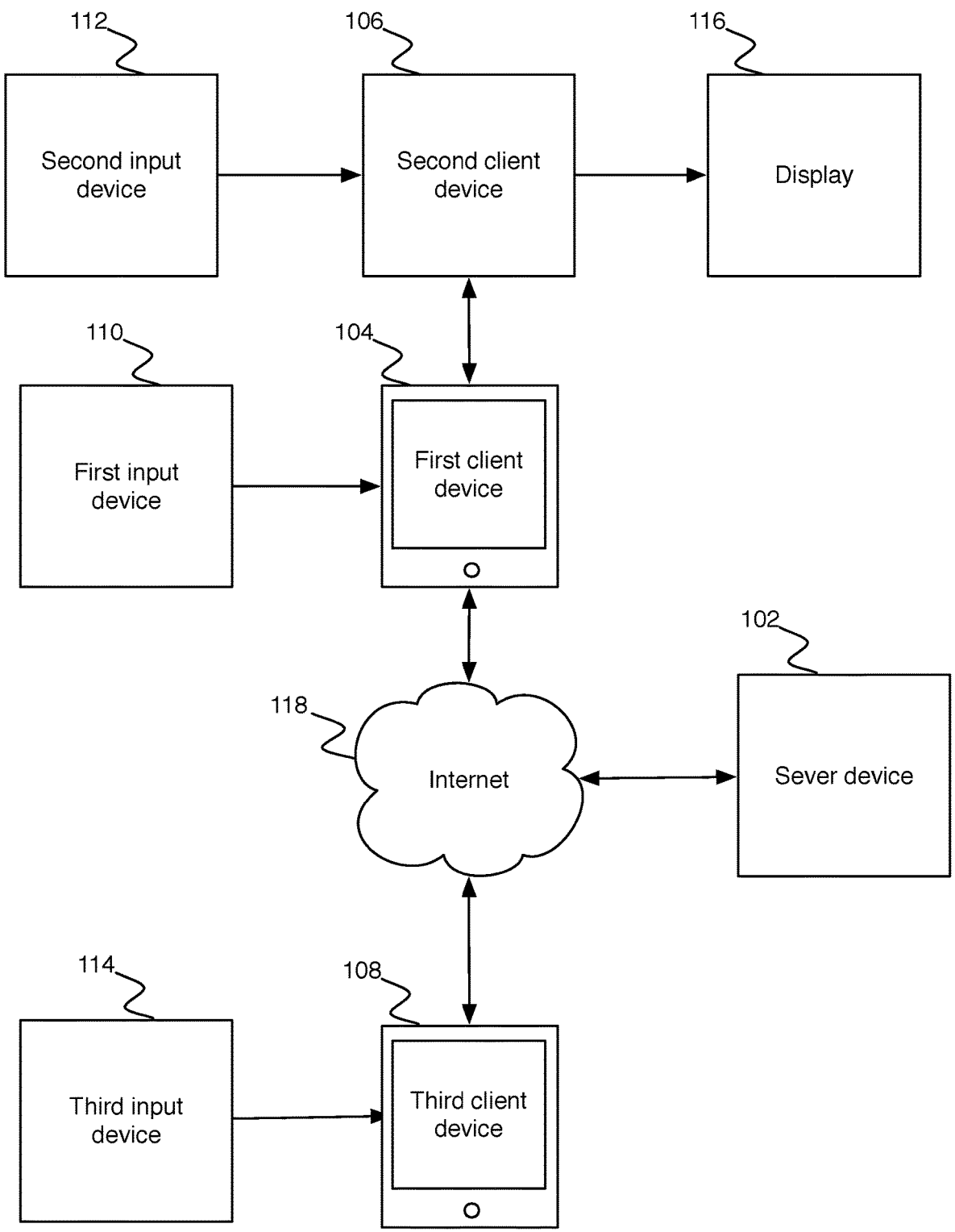
FIG. 1: depicts system 100, in accordance with an embodiment of the invention.

FIG. 1 depicts a system 100 in accordance with an embodiment. System 100 includes first client device 104. System 100 may further include server 102, second client device 106, third client device 108, first input device 110, second input device 112, third input device 114, display 116, and the Internet 118.

Server 102 may be operable to facilitate the delivery of an interactive video, as described in relation to FIGS. 4 to 12. First, second, and third client devices 104, 106, and 108 may further be operable to facilitate the delivery of the interactive video, as described in relation to FIGS. 4 to 12.

Figure 2:
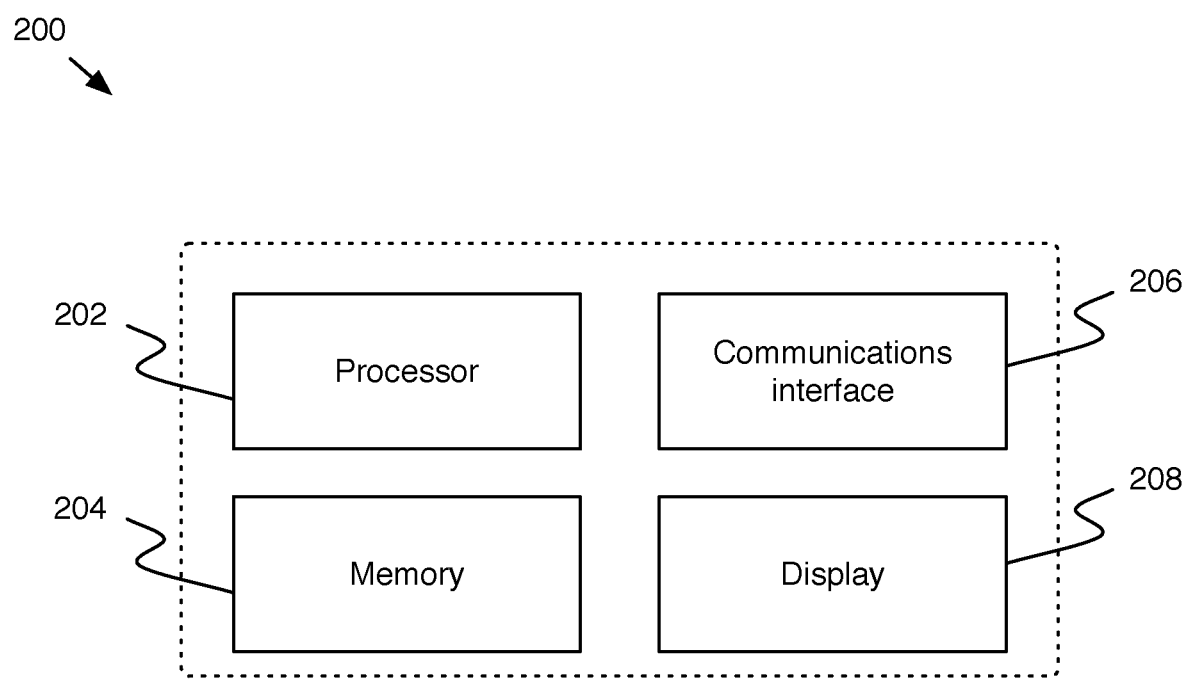
FIG. 2: depicts system 200, in accordance with an embodiment of the invention.

Each of server 102, first client device 104, second client device 106, and third client device 108, may include a processing device 200, as depicted in FIG. 2. Processing device 200 includes a processor 202, a memory 204, and a communication interface 206. In examples, processing device 200 may further include a display 208.

Processor 202 may be configured for executing computer instructions, which, when executed on the system 100, perform a portion or all of the methods described in relation to FIGS. 4 to 12. In embodiments, processor 202 may include a single, or any multiple number of processors, as will be understood by those of skill in the art.

Memory 204 may be an electronically readable medium or a computer readable medium configured to store computer program instructions. In examples, memory 204 may include a non-transitory medium.

Stored computer program instructions, when executed on the processor 202, may perform a portion or all of the methods described in relation to FIGS. 4 to 12.

In examples, processor 202 and memory 204 may be incorporated into a custom chipset, such as a system on a chip. For example, processor 202 and memory 204 may be incorporated into a custom Snapdragon, Tegra, Mali-400, Cortex, Samsung Exynos, Intel Atom, Apple, or Motorola chip, or any other type of chip known to those of skill in the art.

In examples, portions of the methods described in relation to FIGS. 4 to 12 may be stored or executed outside of system 100. For example, a portion of the methods described in relation to FIGS. 4 to 12 may be stored or executed on a combination of a server and cloud storage facility via Internet 118.

Communications interface 206 may be configured to communicate with devices external to server 102, first client device 104, second client device 106, or third client device 108. For example, communications interface 206 may communicate with any of first input device 110, second input device 112, third input device 114, or display 116.

In examples, communications interface 206 may be wired or wireless interfaces. Communications interface 206 may include a short-range or low-powered wireless standard such as Bluetooth, Bluetooth LE, zigbee, or near field communication (NFC). Communications interface 206 may further include WIFI, 3G, 4G, Ethernet, or any other communications known to those of skill in the art. In examples, processing device 200 may request, send, or receive information, save information, or send or receive messages from a remote device over Internet 118.

When the processing device 200 includes an integrated display 208, the display 208 may be operable to display one or more interactive videos in conjunction with the methods described in relation to FIGS. 4 to 12.

In examples, any of first client device 104, second client device 106, or third client device 108 may be a hand-held or mobile computing device such as a smart phone, a tablet, a smart watch, or a wearable device. In further examples, any of first client device 104, first client device 106, or second client device 108 may be a computing apparatus such as a smart TV, a video game console, a laptop, or desktop computer, or an app-enabled piece of household hardware.

In examples, first client device 104, second client device 106, or third client device 108 may receive inputs from one or more inputs from integrated input devices. In further examples, however, first client device 104, second client device 106, or third client device 108 may be connected to any combination external input devices, such as: first input device 110, second input device 112, or third input device 114, respectively.

First client device 104, second client device 106, third client device 108, first input device 110, second input device 112, or third input device 114 may include any combination of input instruments operable to receive information from a human, an animal, or an environment. For example: first, second or third client device 104, 106, 108, or first, second, or third input device 110, 112, 114 may include: a touch screen, a mouse, a game controller, a gesture recognition device, a joystick, a pressure sensing device, an accelerometer, a gyroscope, or a GPS.

In further examples, first, second or third client device 104, 106, 108, or first, second, or third input device 110, 112, 114 may include one or more biomonitor devices, such as a heart rate monitor, an oximeter, or an electromyography monitor. Alternatively, first, second or third client device 104, 106, 108, or first, second, or third input device 110, 112, 114 may include any combination of environmental sensors, such one or more weather or motion sensors. The examples provided are not intended to be limiting, as those of skill in the art will readily understand, first, second or third client device 104, 106, 108, or first, second, or third input device 110, 112, 114 may include any input device.

FIG. 1 includes a server device 102. Server device 102 may be operable to execute instructions, or to retrieve and save data in a database. In examples, server device 102 may include a single server, or multiple servers in a distributed architecture. In examples, server device 102 may support a relational database, a NoSQL database, a distributed database, or any other database known to those of skill.

In examples, server 102 may communicate via Internet 118 to deliver interactive video to at least one of first client device 104 or third client device 108.

In further examples, however, first client device 104 may communicate with second client device 106 to deliver interactive video on at least one of first client device or second client device. In examples, second client device 106 may display video on external display 116.

Figure 3:
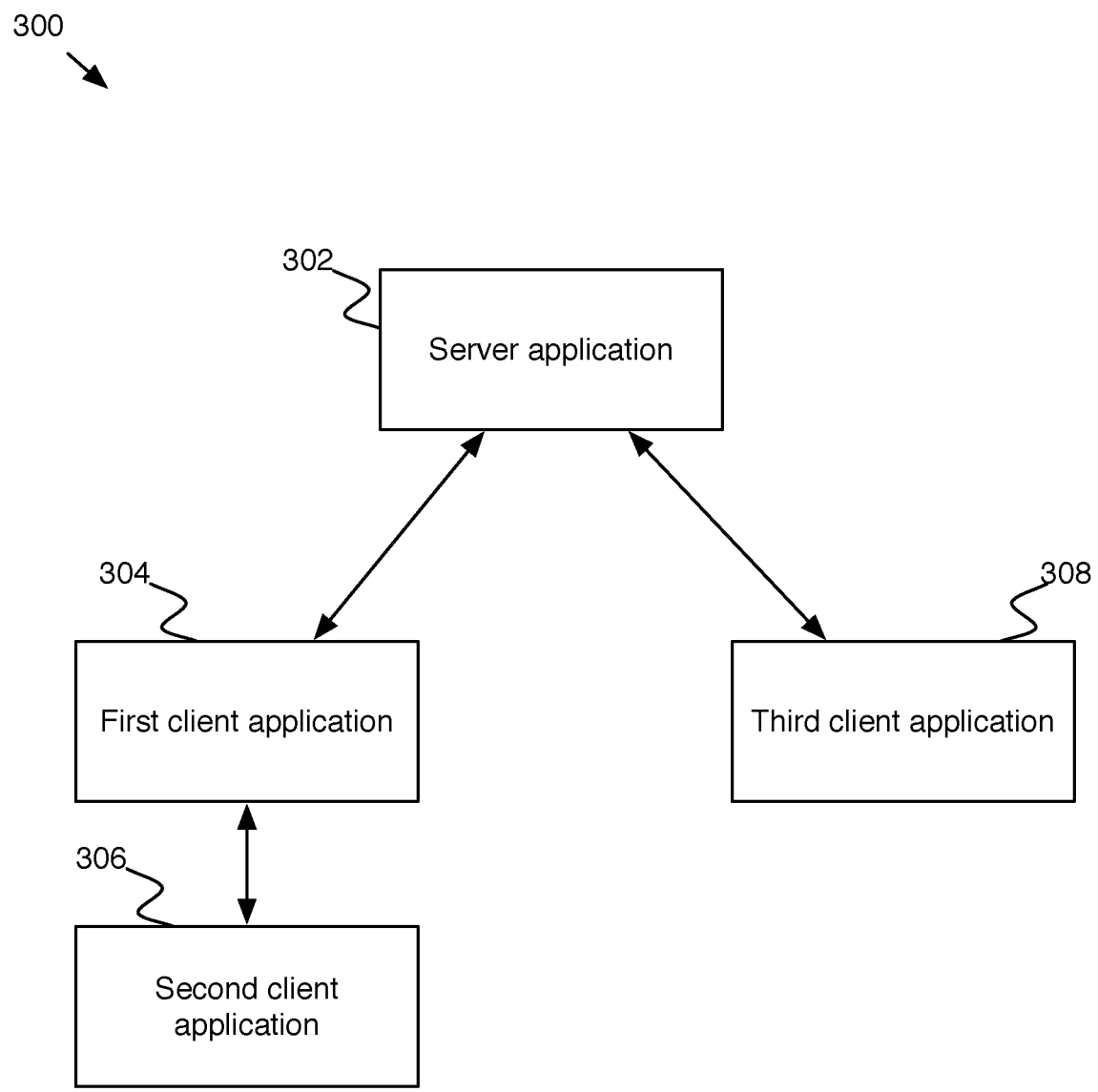
FIG. 3: depicts system 300, in accordance with an embodiment of the invention.

FIG. 3 depicts system 300, in accordance with an embodiment. System 300 may facilitate the delivery of an interactive video. System 300 includes first client application 304. Sytem 300 may further include server application 302, second client application 306, and third client application 308.

Server application 302 may be configured to receive input from at least one of first client application 304, second client application 306, and third client application 308, and to deliver an interactive video.

First client application 304, second client application 306, and third client application 308 may further be configured to receive input and deliver an interactive video.

First and third client applications 304, and 308 may each communicate with server application 302.

Second client application 306 may communicate with first client application 304. Second client application 306 may receive inputs from or transmit inputs to first client application 304. In examples, second client application 306 may display an interactive video after receiving inputs from first client application 304.

In examples, server application 302, first client application 304, second client application 306, and third client application 308 may each operate on separate devices. For example, server application 302 may operate on server device 102; first client application 304 may operate on first client device 104; second client application 306 may operate on second client device 106; and third client application 308 may operate on third client device 108.

In further examples, however, the functions of any one of server application 302, first client application 304, second client application 306, and third client application 308 may be distributed across additional computing devices. For example, server application 302 may operate across a group of distributed servers.

Figure 4:
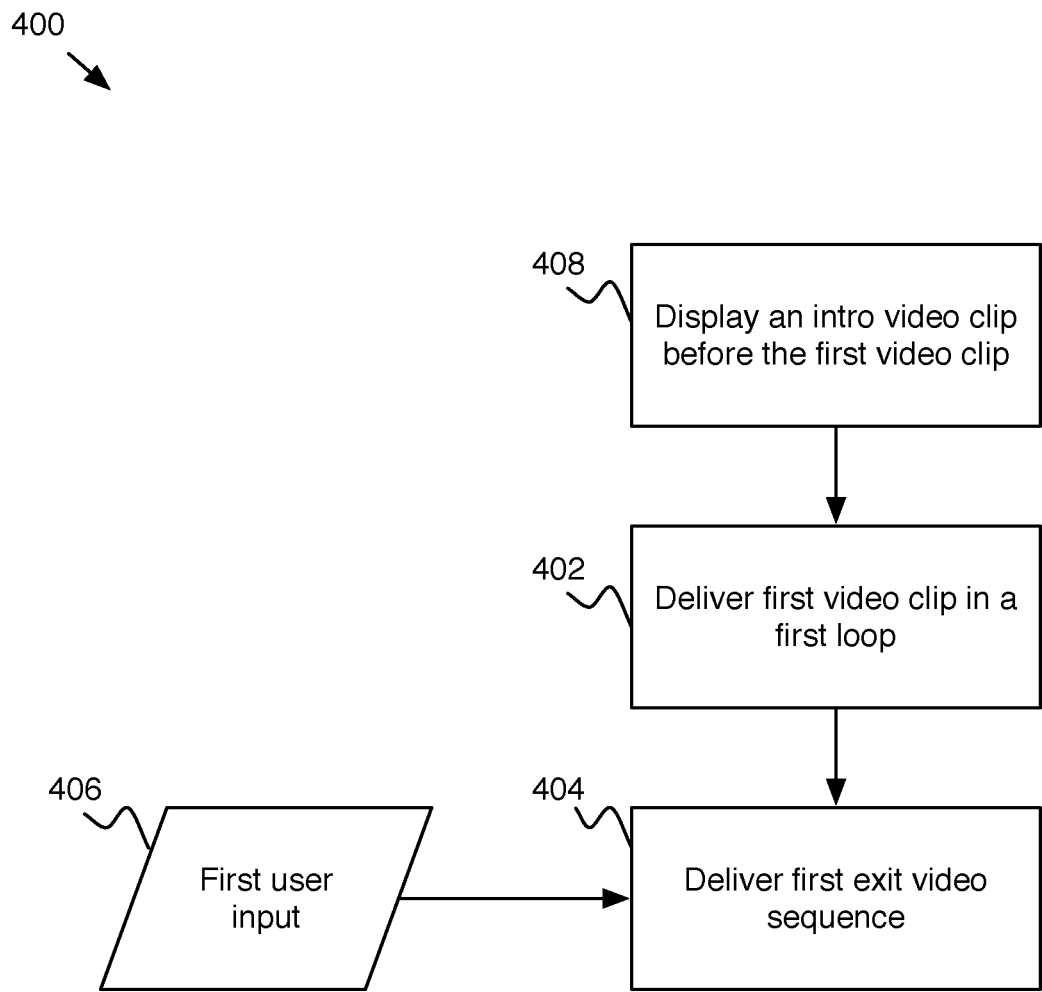
FIG. 4: depicts method 400, in accordance with an embodiment of the invention.

FIG. 4 depicts method 400, an example embodiment that may execute within server application 302, first client application 304, second client application 306, or third client application 308. Method 400 may deliver an interactive video. An interactive video is a video including one or more video clips that may be delivered in response to one or more inputs.

Figure 5A:
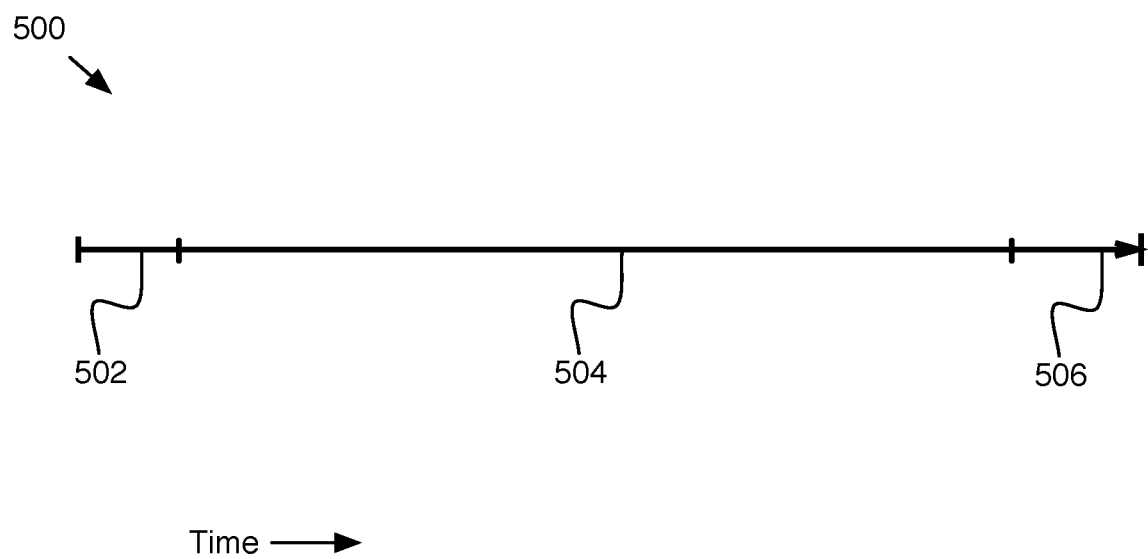
FIG. 5A: depicts interactive video 500, in accordance with an embodiment of the invention.
Figure 5B:
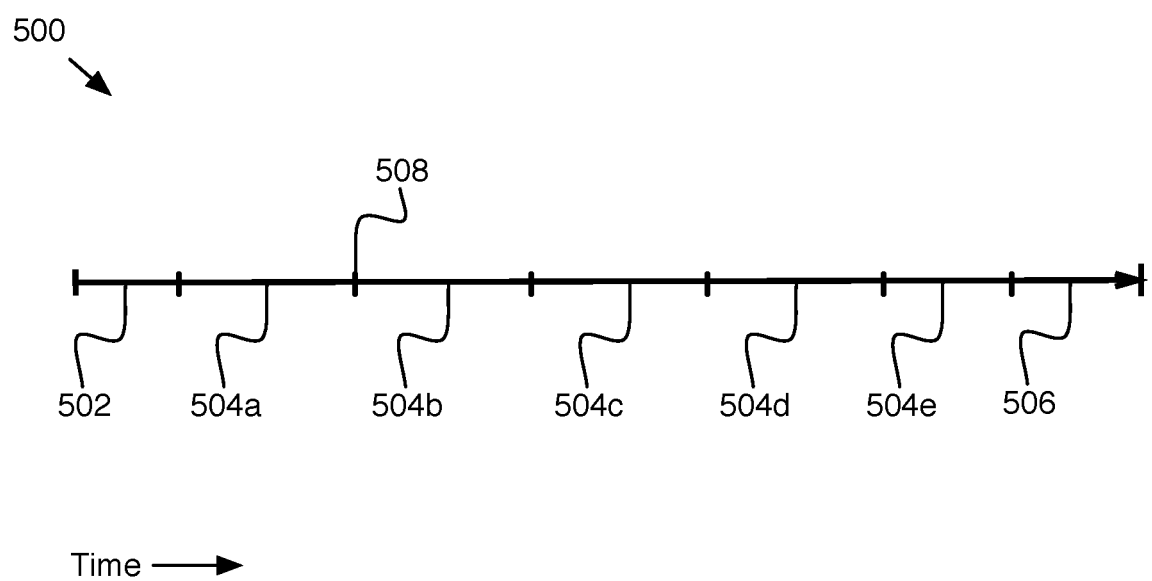
FIG. 5B: depicts interactive video 500, in accordance with an embodiment of the invention.
Figure 6:
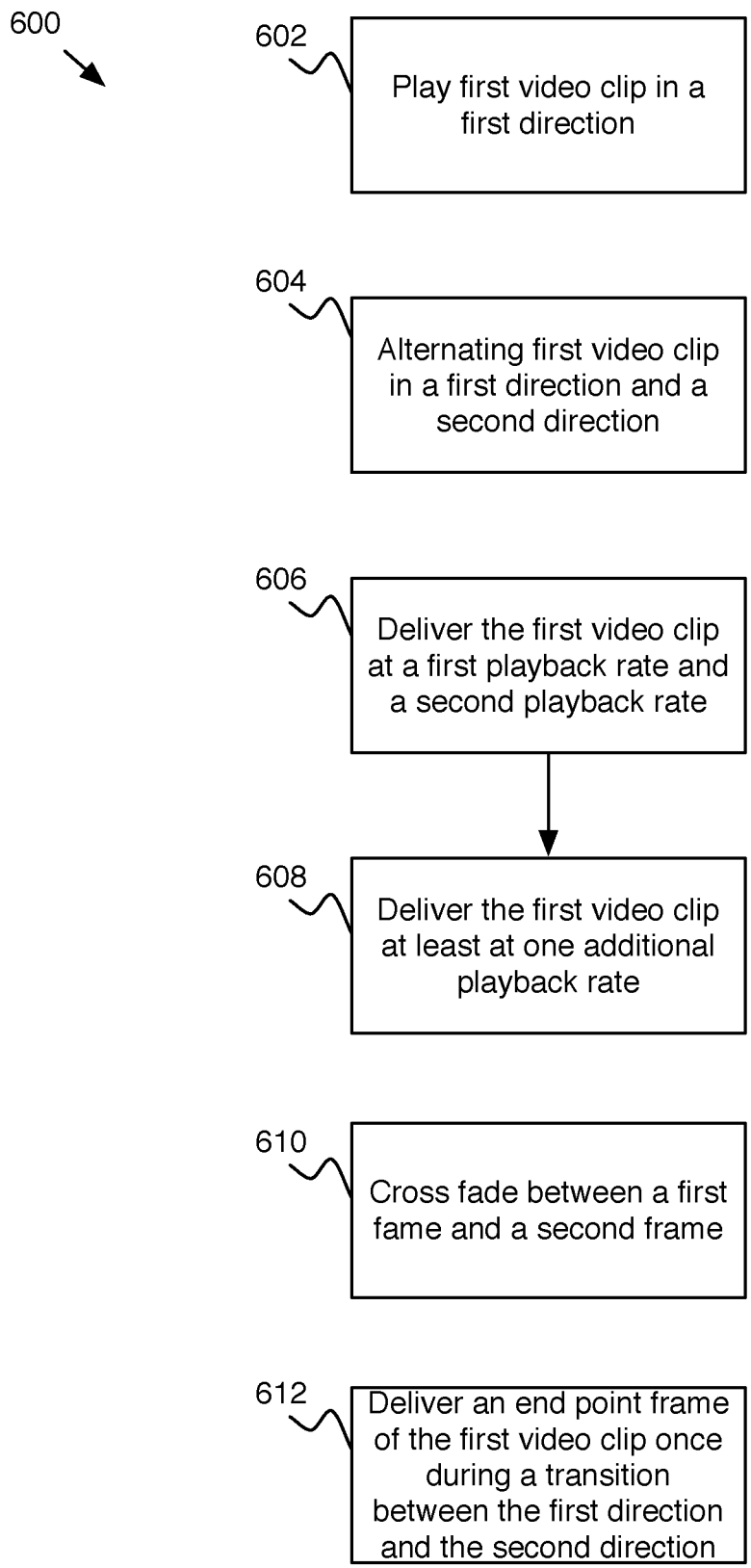
FIG. 6: depicts method 600, in accordance with an embodiment of the invention.
Figure 7:
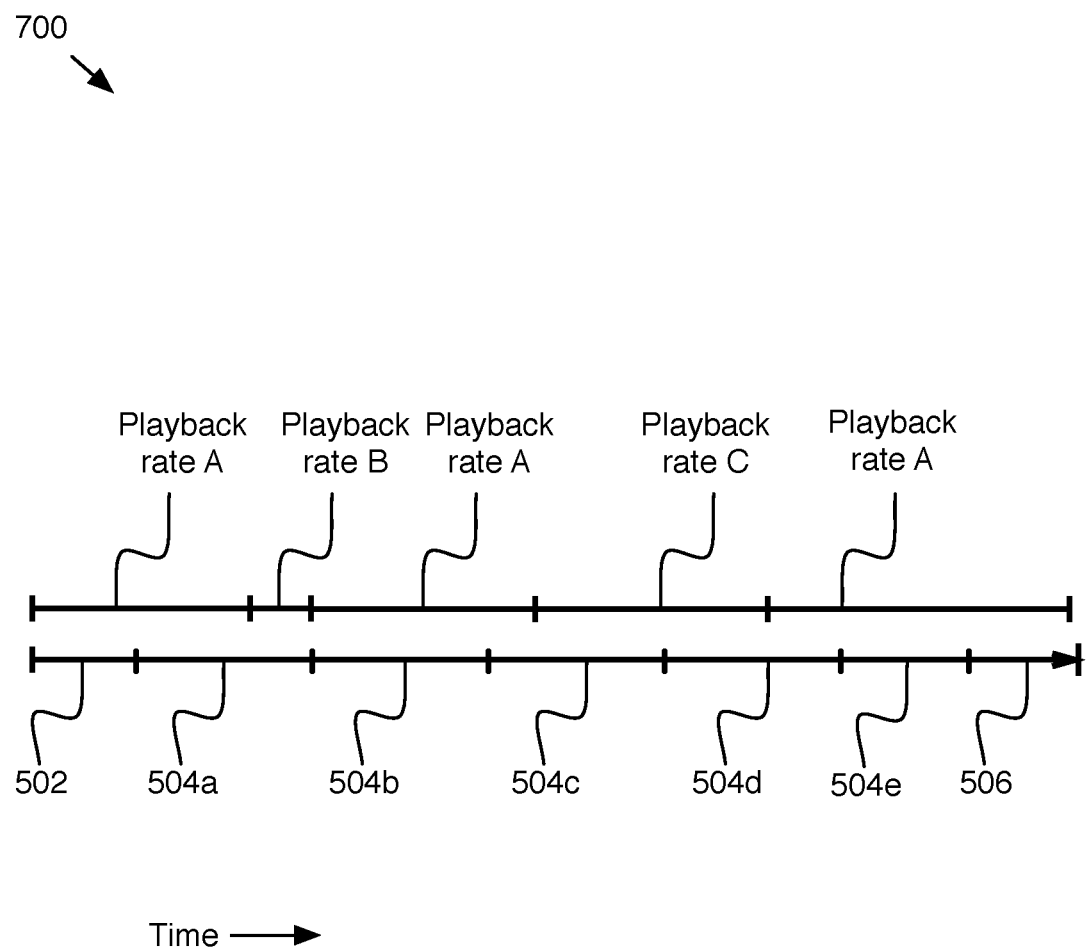
FIG. 7: depicts interactive video 700, in accordance with an embodiment of the invention.
Figure 8:
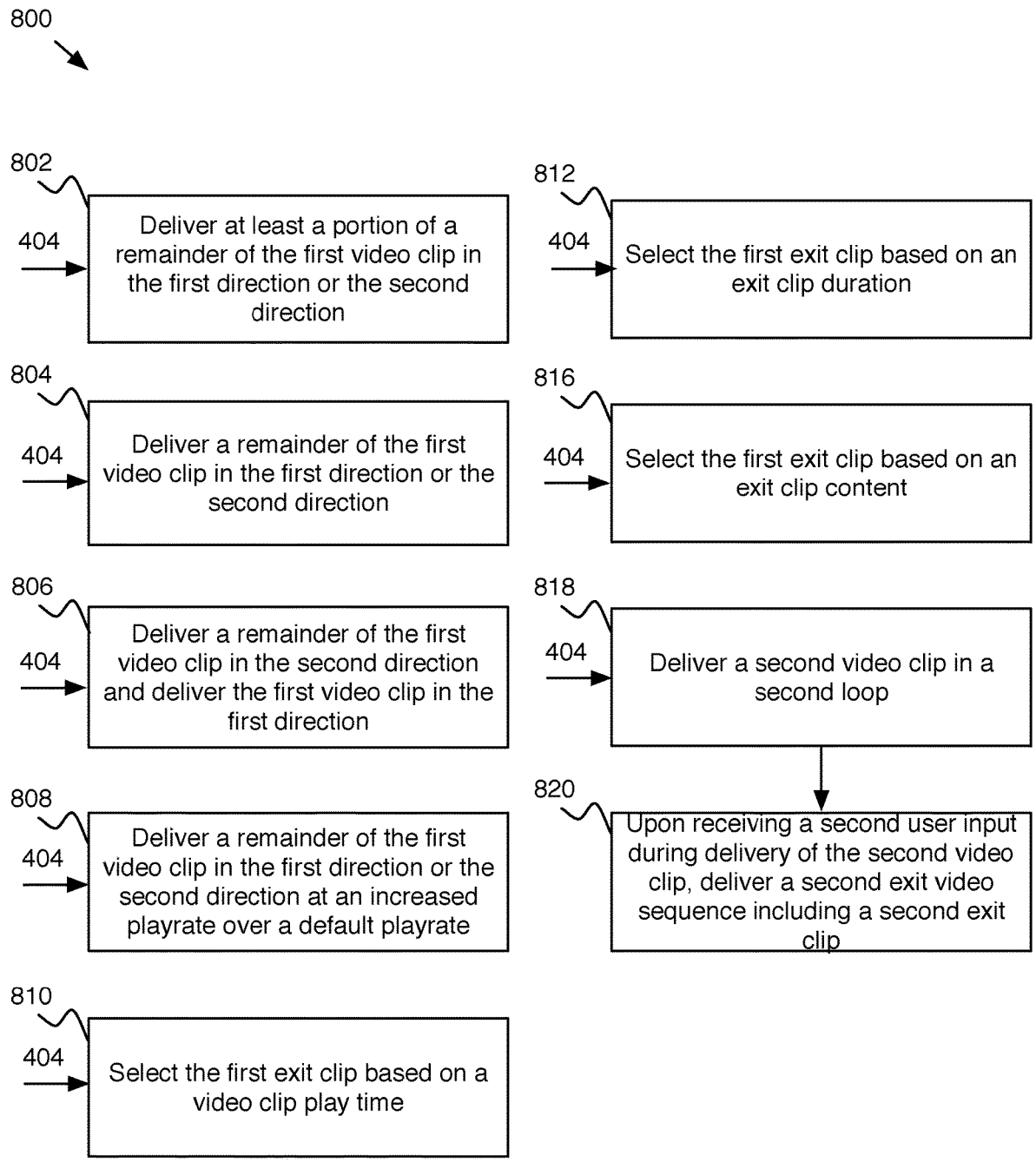
FIG. 8: depicts method 800, in accordance with an embodiment of the invention.

For example, FIGS. 5A and 5B depict example interactive video 500. As may be seen in FIG. 5A, interactive video 500 includes a first video clip 504 and a first exit sequence 506. In further examples, interactive video 500 may further include an intro video clip 502, as will be further explained below.

Intro video clip 502, first video clip 504, and first exit sequence 506 are previously generated video clips. In examples, intro video clip 502, first video clip 504, and first exit sequence 506 may represent segments of a longer video, for example a previously generated video that captures multiple phases of action sequentially. In further examples, intro video clip 502, first video clip 504, and first exit sequence 506 may be produced separately.

Method 400 begins with step 402. In step 402, the first video clip 504 of the interactive video is delivered in a first loop. The first video clip is any video including one or more frames. In examples, the first video clip may include a video including a one or more characters or elements of interest at rest or otherwise in transition between input-based actions, waiting for a further input before taking the next action. For example, the first video clip may include a video game character breathing but other wise sitting still, or a stopped car emitting exhaust.

The first video clip 504 is delivered in a loop. A loop is a repeat playback of a video clip. A loop delivers one or more frames of a video clip sequentially in a frontwards direction, a backwards direction, or in a combination thereof.

In examples, first video clip 504 may include a series of key frames, key frames being intra frames, or complete images stored in a video file. In further examples, first video clip 504 may include both key frames and intermediate frames, intermediate frames being compressed delta frames, stored in a video file. In examples, method 400 may use one or more video codecs to convert intermediate frames to displayable images in a frontwards direction, a backwards direction, or a combination thereof.

Figure 9:
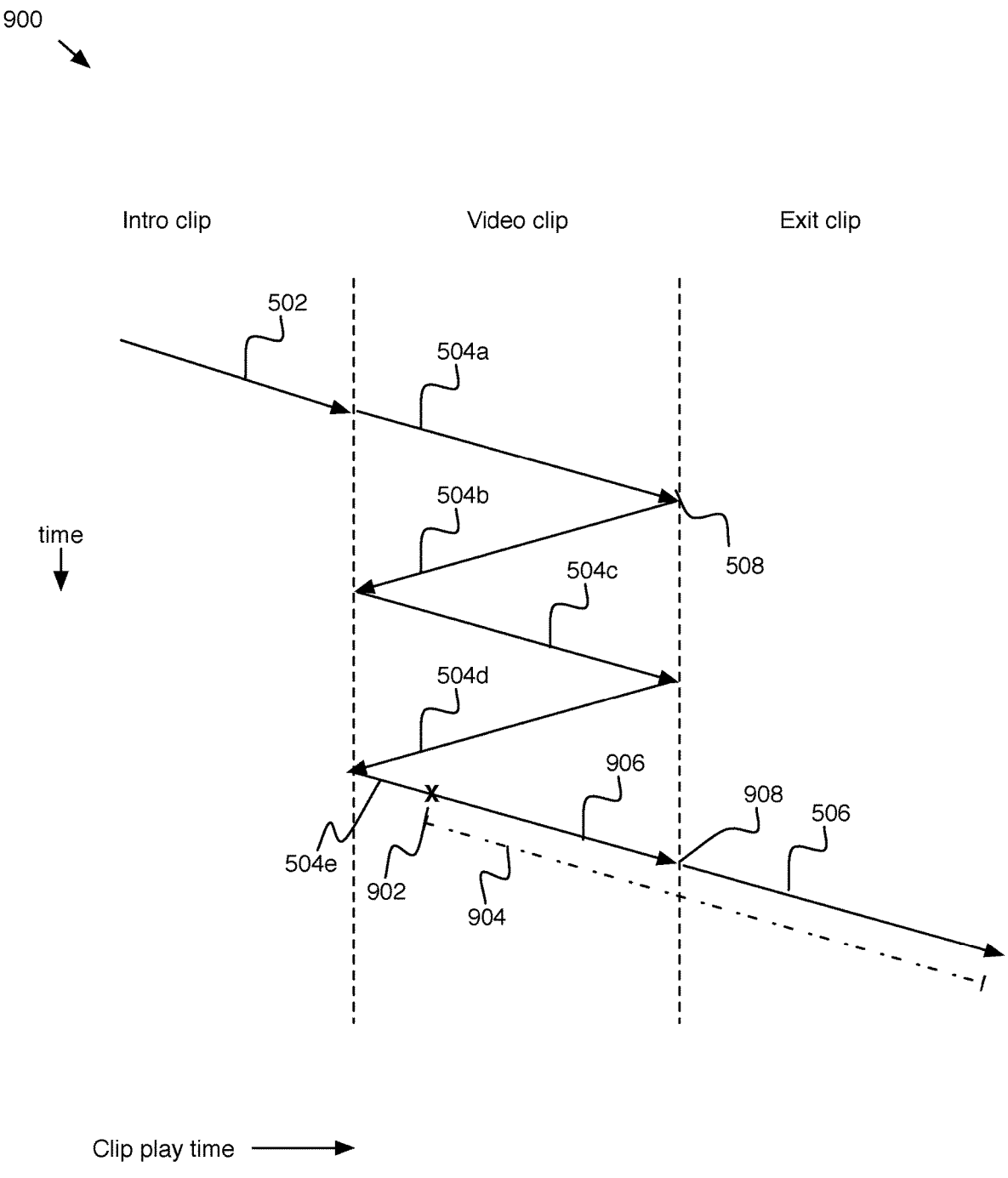
FIG. 9: depicts interactive video 900, in accordance with an embodiment of the invention.
Figure 10:
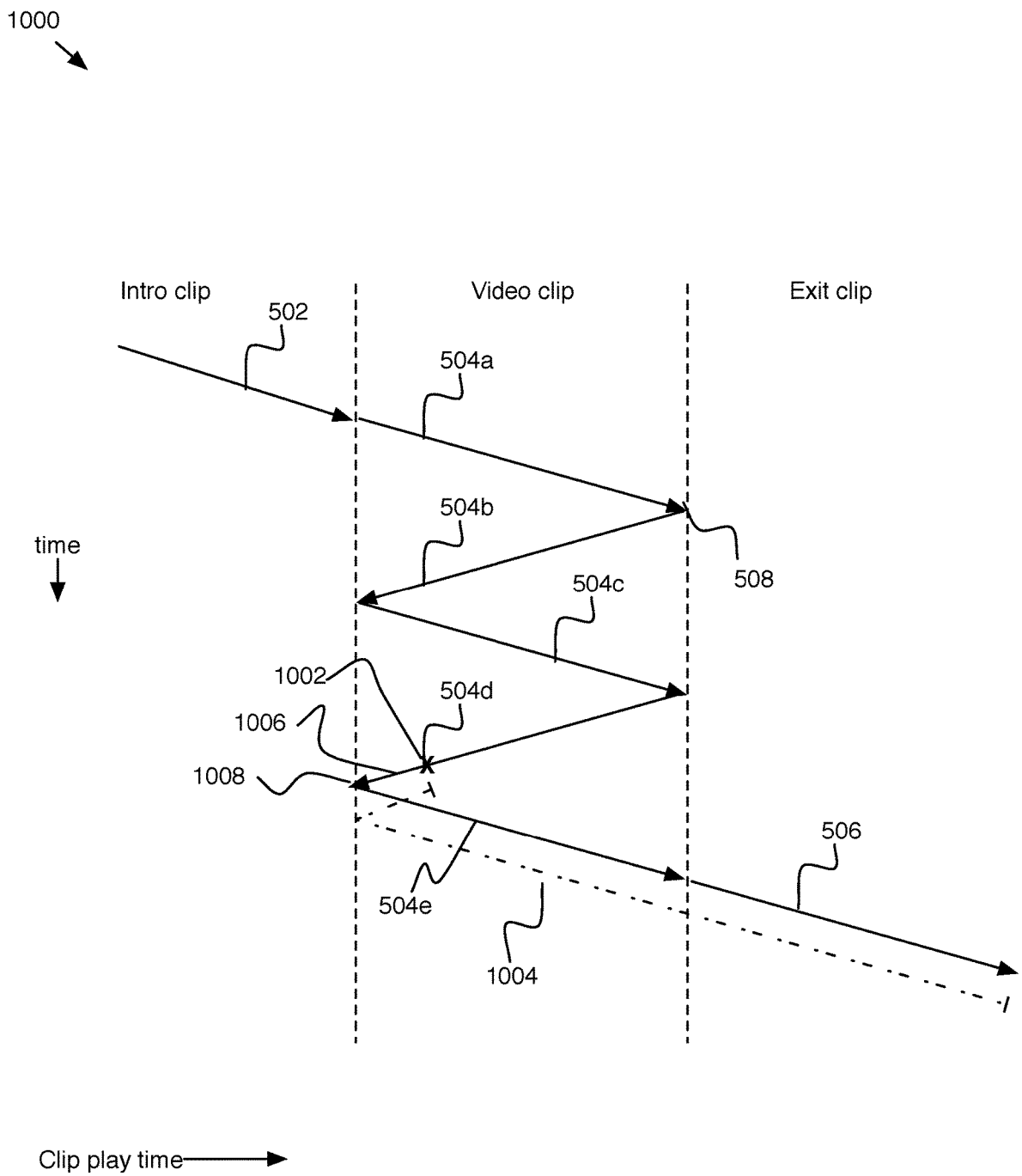
FIG. 10: depicts interactive video 1000, in accordance with an embodiment of the invention.

For example, in FIG. 5B, first video clip 504 includes first loop 504a, second loop 504b, third loop 504c, fourth loop 504d, and fifth loop 504e. FIGS. 9 and 10 further depict interactive videos 900 and 1000, respectively. In FIGS. 9 and 10, the X axis represents the video clip play time, while the Y axis represents the timeline, or run time, of an interactive video. Each of example interactive videos 900 and 1000 also include a respective first loop 504a, second loop 504b, third loop 504c, fourth loop 504d, and fifth loop 504e.

In examples, the first video clip includes live action video. Live action video includes video that was filmed with a camera using real actors and/or objects. In examples, live action video may include no computer-generated graphics or the live action video may include some computer-generated graphics.

In examples, intro video clip 502, first video clip 504, and first exit sequence 506 may have been filmed in one continuous take. In further examples, intro video clip 502, first video clip 504, and first exit sequence 506 may have been filmed separately.

By delivering a live action video clip in a loop while waiting for an input, it may be possible to respond to a user's input more quickly, providing improved transitions between clips. The transitions between the clips may therefore be smooth, creating an improved interactive video experience.

Method 400 continues with step 404. In step 404, upon receiving a first input during delivery of the first video clip, a first exit sequence of the interactive video is delivered, the first exit sequence including a first exit video clip.

The first input may be provided via any of the input devices discussed with reference to first client device 104, second client device 106, third client device 108, first input device 110, second input device, 112, or third input device 114. In examples, the first input may be provided by a user.

The first input may be received at any time. For example, FIG. 9 includes example first input 902, which occurs during loop 504e, and FIG. 10 depicts example first input 1002, which occurs during loop 504d.

An exit video sequence is one or more video clips that are used to transition interactive video out of the first video loop. For example, FIGS. 9 and 10 depict example exit video sequences 904 and 1004, respectively. The exit video sequence may transition the interactive video into an active phase based on the inputs received.

The exit video sequence 904, 1004 includes a first exit video clip. In examples, the exit clip may include action based on the first input, or the exit clip may include a transition to a video clip including action based on the first input. In the examples of FIGS. 9 and 10, example exit video sequences 904 and 1004 include exit video clip 506.

By providing an exit video sequence, it may be possible to provide a natural transition between an inactive scene and an active scene driven by input. This may make the interactive video appear to be more responsive and engaging to a user. Because the method uses pre-existing video clips, the method may deliver a high-quality interactive video while making efficient use of processor and memory resources. This may allow for the porting of high-quality interactive video onto platforms where similar quality interactive video products were not previously accessible, for example on smart phones and tablets.

In examples, method 400 may include further steps. For example, method 400 may include step 408. In step 408, an intro video clip is displayed before the first video clip. In examples, the intro video clip may include a previous input-driven action including one or more characters or elements of interest. In further examples, an intro video clip may transition an interactive video from a previous action scene into the activity of the first video clip. For example, in an intro video clip a character may sit down in a chair, and in the subsequent first video clip, the character may breathe while sitting in the chair.

In examples, step 402 may include further steps. For example, step 402 may include any of the steps of method 600 of FIG. 6.

For example, step 402 may include step 602. In step 602, first video clip 504 is delivered in a first direction. For example, first video clip 504 may be looped from the start-to-end or end-to-start.

In examples, step 402 may include step 604 of method 600. In step 604, the first video clip may alternate delivery of the first video clip in the first direction and delivery of the first video clip in a second direction.

For example, in FIG. 9 first video clip 504 is delivered in five segments: 504a, 504b, 504c, 504d, and 504e. Segments 504a, 504c, and 504e are delivered in a first direction, which in the example is start-to-end of the first video clip, and segments 504b and 504d are delivered in a second direction, a reverse direction, or end-to-start of the video clip. The example of FIG. 9 is not intended to be limiting, however. As those of skill in the art will readily understand, in further examples, the first direction may be end-to-start and the second direction may be start-to-end.

By alternating delivering of the first video clip between a first direction and a second direction, it may be possible to provide a natural-looking loop of interactive video using only a short clip of video until a further input is provided. For example, if the video loop includes footage of an actor taking in a deep breath of air in a first direction, reversing the video clip in a loop will create the appearance of the actor exhaling.

In examples, step 402 may include step 606 of method 600. In step 606, the first video clip is delivered at a first playback rate and the first video clip is delivered at a second playback rate. The first playback rate is different from the second playback rate. For example, a video clip may be delivered at a playback rate that is slower than, faster than, a default playback rate. In examples, the default playback rate may emulate the timing at which the events filmed unfolded while they were being filmed.

By varying the delivery playback rate of a video clip, it may be possible to provide more natural-looking interactive video that doesn't appear to be repeating.

In examples, step 402 may further include step 608 of method 600. In step 608, the first video clip may be delivered at least at one additional playback rate. The at least one additional playback rate is different from the first and second playback rates.

In examples, step 402 may further include step 610 of method 600. In step 610, cross fading may be applied between a first frame adjacent to a second frame. The cross fading may be applied by delivering a video clip that includes fading the first frame while allowing the second frame to slowly appear. This may help, for example, to smooth the transition between the first video clip and the exit clip.

In examples, step 402 may further include step 612 of method 600. In step 612, an end point frame of the first video clip is delivered only once during a transition between the first direction and the second direction. An end point frame is a first or a last frame of a loop 504.

For example, FIG. 5B depicts example end point frame 508, which is positioned between first loop 504*a* and second loop 504*b*. End point frame 508 is the last frame included in first loop 504*a* and the first frame included in second loop 504*b*. By playing the end point frame 508 only once during the transition between the first and second directions, it may be possible to the appearance of a pause in action, and to thereby make the interactive video appear more natural to a viewer.

In examples, step 404 may include further steps to deliver the exit video sequence upon receiving the first input. For example, step 404 may include one or more of the steps of method 800 of FIG. 8. Method 800 includes step 802. In step 802, at least a portion of a remainder of the first video clip is delivered in the first direction or the second direction.

The remainder of the first video clip starts at the clip playtime when the first input is received. For example, FIGS. 9 and 10 represent example inputs 902 and 1002, respectively. Remainders 906 or 1006 are inclusive of the frames of the video clip between the clip playtime marked by input 902 or 1002 and the end of the loop being played 908 or 1008, in the direction of play. For example, remainder 906 includes loop 504*e* between input 902 and an end point frame 908. Remainder 1006 includes loop 504*d* between input 1002 and an end point frame 1008.

By delivering at least a portion of the remainder of the first clip, it may be possible to provide for a natural transition between the video clip loops 504 and the exit clip 506.

In examples, step 404 may include step 804 of method 800. In step 804, a remainder of the first video clip is delivered in the first direction or the second direction. Step 404 is similar to step 402, except that in step 404 the entire remainder of the first video clip is delivered.

In examples, step 404 may further include step 806 of method 800. In step 806, a remainder of the first video clip is delivered in the second direction and the first video clip is delivered in the first direction. For example, FIG. 10 depicts that input 1002 is received during loop 504*d*, when the video clip is delivered in a second direction. Delivering exit sequence 1004 includes delivering the remainder of the first video clip 1006, and the first video clip in the first direction, or loop 504*e*.

By delivering both the remainder of the first video clip in a second direction and the video clip in the first direction during exit sequence 1004, it may be possible to end first video clip at a desired transitional frame before delivering exit clip 506. This may provide a smooth transition between the video clip and the exit clip.

In examples, step 404 may further include step 808 of method 800. In step 808, a remainder of the first video clip is delivered in the first direction or the second direction at an increased playback rate over a default playback rate. For example, remainder 906 or 1006 may be delivered with a higher playback speed over a default playback rate to decrease the delay between the input and when the interactive video appears to react to the input.

In examples, step 404 may further include step 810 of method 800. In step 810, the first exit video clip is selected based on a video clip playtime. The video clip playtime is the amount of time that a video clip has played after playing the start frame of the video clip.

By selecting the first exit video clip based on the video clip playtime, it may be possible to match the action in the selected exit clip to the action at different playtimes of the video clip, allowing for the interactive video to appear responsive sooner than waiting until the end of the video clip. This may provide for more natural-appearing transitions.

In examples, step 404 may include step 812 of method 800. In step 812, the first exit video clip is selected based on an exit clip duration. The exit clip duration is the total amount of time that it takes to deliver an exit clip using a default playback speed.

Selecting the first exit video clip based on the video clip playtime may, for example, allow the interactive video to deliver an exit clip having a shortened duration when the video clip duration is relatively long. This may ensure that an exit sequence does not take longer than a maximum duration to deliver.

In examples, step 404 may include step 816 of method 800. In step 816, the first exit video clip is selected based on an exit clip content. This may allow the first exit video clip to be selected based on the action associated with the input received. For example, if a user provides an input to move a character to the left, the first exit video clip may first move the character's head to face the direction he will walk in. If a user provides an input for a user to open a door, however, the first exit video clip may extend the user's arm towards the door.

In examples, step 404 may include steps 818 and 820 of method 800. In step 818, a second video clip is delivered in a second loop. In examples, the first video clip may be delivered in a first area of a display and the second video clip may be displayed in a second area of a display. In examples, the first video clip and the second video clip may respond to the same inputs or different inputs.

Figure 11:
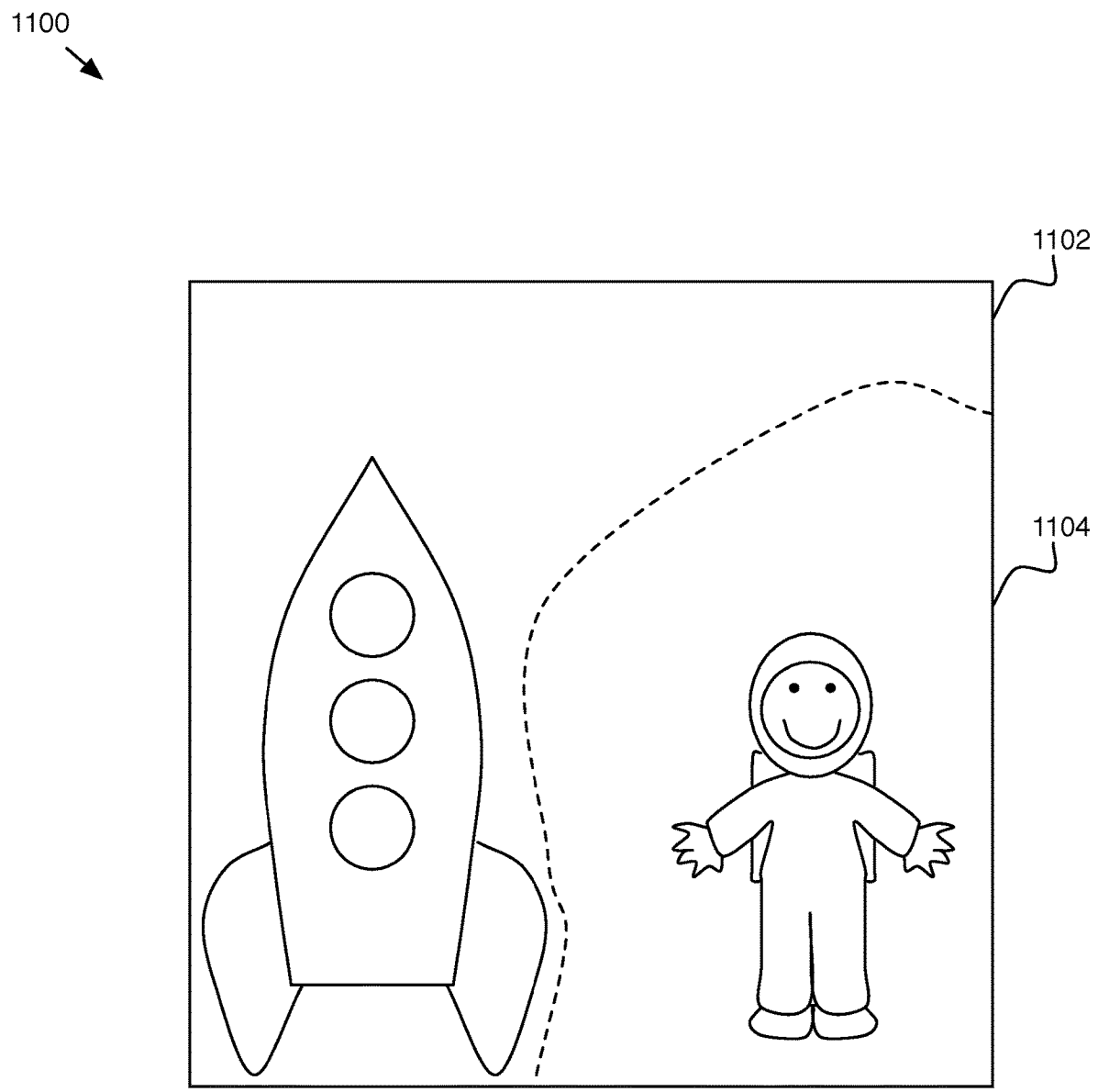
FIG. 11: depicts display 1100, in accordance with an embodiment of the invention.

For example, FIG. 11 depicts display 1100. Display 1100 includes a first area 1102 where a first video clip is delivered, and a second area 1104 where a second video clip is delivered. In the example, of display 1100, the first video clip includes a video of a rocket, and the second video clip includes a video of an astronaut.

By allowing multiple video loops to be present on a single display, it may be possible to provide an efficient high-quality, interactive video with multiple interactive features.

In step 820, upon receiving a second input during delivery of the second video clip, a second exit video sequence is delivered including a second exit clip.

In examples, a first set of inputs may be correlated to actions of the rocket in the first video clip, and a second set of inputs may be correlated to the actions of the astronaut in the second video clip. In examples, a further set of inputs may be correlated to both the rocket and the astronaut.

In examples, a first video clip may correspond to inputs received from a first user and the second video clip may correspond to inputs received from a second user in a single interactive video. For example, separate players may be playing the same instance of a video game.

The methods describe above may allow for the creation of responsive interactive video experiences using previously created video clips, while avoiding the additional cost and complexity of creating custom computer-generated graphics. The methods may further create an interactive experience that is more realistic and relatable to users because real actors and objects are used.

The methods described above may also allow for the delivery of high-quality, responsive, realistic interactive video that can be displayed or deployed on devices with less capable graphics processing units and limited batter life than standard desktop computers. This may make interactive video content more accessible to users.

In examples, delivering the first video clip and the first exit sequence may comprise displaying the first video clip and the first exit sequence on a display. For example, the first video clip and the first exit sequence may be displayed on any display 208, including a display integrated onto first, second, or third client devices 104, 106, or 108.

Alternatively, the first video clip and the first exit sequence may be displayed on an external display connected to a client device, such as display 116. For example, FIG. 12 depicts sequence diagram 1200. As may be seen in sequence diagram 1200, first client application 304 may send first message 1202 to second client application 306. Second client application 306 may respond by sending second message 1204 to display 116 in turn.

In examples, first message 1202 may include input received at first client application 304. In further examples, first message 1202 may include video clips or frames.

In examples, second message 1204 may include instructions to display one or more video clips. In further examples, second message 1204 may include actual video clips or frames to be displayed on first client application 304.

The system depicted in sequence diagram 1200 may allow a user providing inputs for an interactive video on first client device 104, for example a smartphone, to stream the interactive video to a second client device 106, for example a game controller, which can display the interactive video on a separate display 116, for example a television. This may allow one or more users to view the interactive video on a larger screen. It may also allow one or more additional users to interact with the interactive video.

The system depicted in sequence diagram 1300 may allow a user to provide inputs to a client device that are sent to a server, and to receive interactive video from a server in turn based on the inputs.

For example, sequence diagram 1300 depicts first client application 304 transmitting a first message 1302 to server application 302. In examples, first message 1302 may include inputs. Server application 302 transmits third message 1306 back to first client application. In examples, the third message may include, for example, one or more video clips or one or more video frames in response to the input provided in the first message. For example, third message 1306 may include the first video clip and the first exit sequence.

In examples, sequence diagram 1300 may further include a third client application 308. As may be seen in FIG. 13, third client application 308 may further transmit a second message 1304 to server application 302. Second message 1304 may include further inputs from an additional user. In response, sever application 302 may transmit third message 1306 to third client application 308 in addition to first client application 304. The system depicted in FIG. 13 may allow multiple users to interact with the same interactive video.

Figure 14:
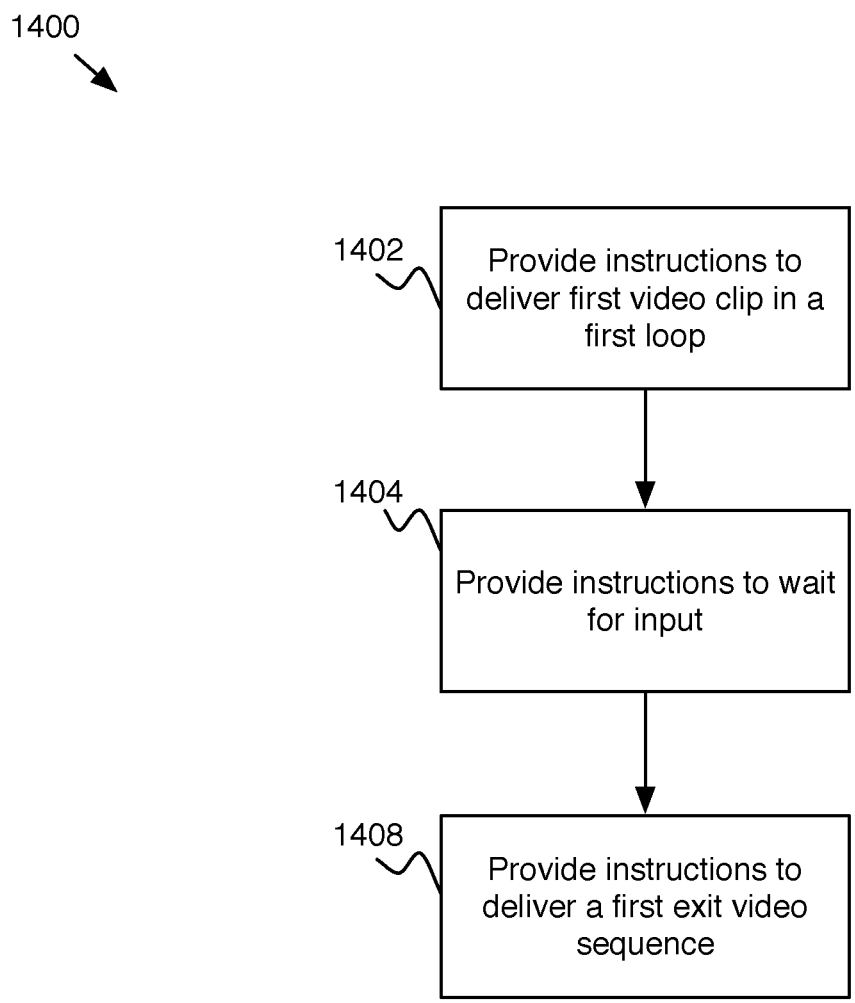
FIG. 14: depicts method 1400, in accordance with an embodiment of the invention.

FIG. 14 depicts method 1400, an example embodiment that may be used to create an interactive video. Method 1400 begins with step 1402. In step 1402, instructions are provided to deliver a first video clip of the interactive video in a first loop.

Providing instructions may include creating a script, source code, object code, or executable code to perform actions. In examples, the instructions may be created to run on a server device, a client device, or a combination thereof, as described above.

For example, step 1402 may provide the following example implementation of an interactive video. The example is provided in pseudo code, with comments noted by "//":

```
// load the first video clip to loop
queuebg("first_video_clip.mov")
// wait for prior clip to finish
wait("prior_video_clip_done")
// start playing first video clip in loop
playqueuedbg( )
```

Method 1400 continues with step 1404. In step 1404, instructions are provided to wait for input during delivery of the first video clip.

For example, step 1402 may provide the following example pseudocode:
wait("input")

Method 1400 continues with step 1406. I step 1406, instructions are provided to deliver a first exit sequence of the interactive video, the first exit sequence including a first exit video clip.

For example, step 1406 may provide may provide the following example pseudocode:

```
// progress corresponds to playtime over first video clip length
progress = playtimeInCurrentClip( ) / currentClipLength( )
// determine quadrant of first video clip playtime (progress)
// select and queue exit video clip
// calculate when to exit first video clip to the exit clip
if (progress < 0.25) then
    queuebg("exit clip A.mov")
    frame = math.floor(remainingPlaytime( ) * 0.25) − 1
elseif (progress < 0.5) then
        queuebg("exit clip B.mov")
            frame = math.floor(remainingPlaytime ( ) * 0.5) − 1
elseif (progress < 0.75) then
        queuebg("exit clip C.mov")
            frame = math.floor(remainingPlaytime ( ) * 0.75) − 1
else
        queuebg("exit clip D.mov")
            frame = math.floor(remainingPlaytime ( ) * 0.75) − 1
end
// deliver at least a portion of a remainder of the first video clip
waitForFrame(frame)
// play the exit clip
playqueuedbg( )
```

In examples, method 1400 may further include steps to provide instructions to provide the features described in methods 400, 600, and 800.

While the disclosure of the present application has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of applicant's general inventive concept.

The invention claimed is:

1. A method for delivering an interactive video, the method comprising:
    delivering a first video clip of the interactive video in a first loop, wherein delivering the first video clip in the first loop provides frames of the first video clip for playback in a frontwards direction and then in a backwards direction; and
    upon receiving a first input during delivery of the first video clip during playback in the backwards direction, delivering a remainder of the first video clip in the backwards direction, the first video clip in the frontwards direction and a first exit sequence of the interactive video, the first exit sequence including a first exit video clip,
    wherein the first video clip is delivered in the first loop for playback of the frames in the frontwards direction and then in the backwards direction until the first input is received during delivery of the first video clip in the first loop, wherein the first video clip is delivered in the first loop such that the frames in the first video clip are played in the backwards direction and the frontwards direction after receiving the first input during playback in the backwards direction and before frames of the first exit video clip are played, and wherein the first video clip includes live action video.

2. A method as claimed in claim 1, wherein delivering the first video clip in the first loop further comprises:
    delivering the first video clip at a first playback rate and then delivering the first video clip at a second playback rate.

3. A method as claimed in claim 2, wherein delivering the first video clip in the first loop further comprises:
    delivering the first video clip at least at one additional playback rate.

4. A method as claimed in claim 2, wherein the second playback rate is faster than the first playback rate.

5. A method as claimed in claim 4, wherein the first video clip is delivered at the second playback rate after receiving the first input and upon receiving the first input, the first video clip is delivered to an end of the first video clip before the first exit video clip is delivered.

6. A method as claimed in claim 1, wherein delivering the first video clip and the first exit sequence further comprises:
    cross fading between a first frame of the first video clip and a second frame of the first exit sequence.

7. A method as claimed in claim 1, wherein delivering the first video clip in the first loop further comprises:
    delivering an end point frame of the first video clip only once during a transition between the frontwards direction and the backwards direction.

8. A method as claimed in claim 1, wherein the method further comprises:
    delivering an intro video clip before the first video clip.

9. A method as claimed in claim 1, wherein delivering the first exit sequence including the first exit video clip further comprises:
    delivering at least a portion of the first video clip in the frontwards direction at an increased playback rate before delivering the first exit video clip.

10. A method as claimed in claim 1, wherein delivering the first exit sequence including the first exit video clip further comprises:
    delivering the remainder of the first video clip in the backwards direction at an increased playback rate before delivering the first exit video clip.

11. A method as claimed in claim 1, wherein delivering the first exit sequence including the first exit video clip further comprises:
    delivering a remainder of the first video clip in the backwards direction at an increased playback rate and delivering the first video clip in the frontwards direction at an increased playback rate before delivering the first exit video clip.

12. A method as claimed in claim 1, wherein delivering the first exit sequence including the first exit video clip further comprises:
    delivering the remainder of the first video clip in the backwards direction at an increased playback rate over a default playback rate before delivering the first exit video clip.

13. A method as claimed in claim 1, wherein delivering the first exit sequence including the first exit video clip further comprises:
    selecting the first exit video clip based on a video clip play time.

14. A method as claimed in claim 1, wherein delivering the first exit sequence including the first exit video clip further comprises:
    selecting the first exit video clip based on an exit clip duration.

15. A method as claimed in claim 1, wherein delivering the first exit sequence including the first exit video clip further comprises:
    selecting the first exit video clip based on an exit clip content.

16. A method as claimed in claim 1, wherein delivering the interactive video further comprises:
    delivering a second video clip in a second loop; and
    upon receiving a second input during delivery of the second video clip, delivering a second exit video sequence including a second exit clip.

17. A method as claimed in claim 1, wherein delivering the first video clip and the first exit sequence comprises displaying the first video clip and the first exit sequence.

18. A method as claimed in claim 1, wherein delivering the first video clip and the first exit sequence comprises transmitting the first video clip and the first exit sequence to a client application.

19. A method of creating an interactive video for delivery in accordance with the method of claim 1, the method comprising:
    providing instructions to deliver a first video clip of the interactive video in a first loop;
    providing instructions to wait for input during delivery of the first video clip; and providing instructions to deliver a first exit sequence of the interactive video, the first exit sequence including a first exit video clip;
wherein the first video clip is delivered in a frontwards direction and then in a backwards direction such that video in the first video clip loops forwards and backwards during playback, and wherein the first video clip includes live action video.

20. A method as claimed in claim 1, wherein the interactive video is an interactive video game.

21. A method as claimed in claim 1, wherein upon receiving the first input, the first video clip is delivered to an end of the first video clip in the frontwards direction before the first exit video clip is delivered.

22. A system for delivering an interactive video comprising:
 a memory configured to store a first video clip and a first exit video clip; and
 a processor configured to deliver the first video clip of the interactive video in a first loop and, wherein delivering the first video clip in the first loop provides frames of the first video clip for playback in a frontwards direction and then in a backwards direction, and upon receiving a first input during delivery of the first video clip during playback in the backwards direction, to deliver a remainder of the first video clip in the backwards direction, the first video clip in the frontwards direction and a first exit sequence of the interactive video, the first exit sequence including the first exit video clip,
 wherein the first video clip is delivered in the first loop for playback of the frames in the frontwards direction and then in the backwards direction until the first input is received during delivery of the first video clip in the first loop, wherein the first video clip is delivered in the first loop such that the frames in the first video clip are played in the backwards direction and the frontwards direction after receiving the first input during playback in the backwards direction and before frames of the first exit video clip are played, and wherein the first video clip includes live action video.

23. A computer-readable non-transitory storage medium storing a computer program to be executed by a computer, the program, when executed, causing the computer to at least:
 deliver a first video clip of an interactive video in a first loop, wherein delivering the first video clip in the first loop provides frames of the first video clip for playback in a frontwards direction and then in a backwards direction; and
 upon receiving a first input during delivery of the first video clip during playback in the backwards direction, deliver a remainder of the first video clip in the backwards direction, the first video clip in the frontwards direction and a first exit sequence of the interactive video, the first exit sequence including a first exit video clip,
 wherein the first video clip is delivered in the first loop for playback of the frames in the frontwards direction and then in the backwards direction until the first input is received during delivery of the first video clip in the first loop, wherein the first video clip is delivered in the first loop such that the frames in the first video clip are played in the backwards direction and the frontwards direction after receiving the first input during playback in the backwards direction and before frames of the first exit video clip are played, and wherein the first video clip includes live action video.

* * * * *